(12) United States Patent
Delo

(10) Patent No.: US 7,047,529 B2
(45) Date of Patent: *May 16, 2006

(54) SOFTWARE INSTALLATION AND VALIDATION USING CUSTOM ACTIONS

(75) Inventor: John C Delo, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/995,031

(22) Filed: Nov. 22, 2004

(65) Prior Publication Data

US 2005/0172283 A1 Aug. 4, 2005

Related U.S. Application Data

(63) Continuation of application No. 09/994,254, filed on Nov. 26, 2001, now Pat. No. 6,920,631, which is a continuation of application No. 09/157,776, filed on Sep. 21, 1998, now Pat. No. 6,378,127.

(51) Int. Cl.
G06F 9/445 (2006.01)

(52) U.S. Cl. ...................................... 717/174

(58) Field of Classification Search ........ 717/168–178; 707/100
See application file for complete search history.

(56) References Cited

U.S. PATENT DOCUMENTS

| | | | |
|---|---|---|---|
| 5,008,814 A | 4/1991 | Mathur | |
| 5,361,360 A | 11/1994 | Ishigami et al. | |
| 5,367,686 A | 11/1994 | Fisher et al. | |
| 5,560,026 A | 9/1996 | Manthuruthil et al. | |
| 5,586,304 A | 12/1996 | Stupek, Jr. et al. | |
| 5,835,777 A | 11/1998 | Staelin | |
| 5,859,969 A | 1/1999 | Oki et al. | |
| 5,860,012 A | 1/1999 | Luu | |
| 5,870,611 A | 2/1999 | London Shrader et al. | |
| 5,872,979 A | 2/1999 | Edel et al. | |
| 5,893,911 A | 4/1999 | Piskiel et al. | |
| 5,933,647 A | 8/1999 | Aronberg et al. | |
| 5,950,010 A | 9/1999 | Hesse et al. | |
| 5,960,204 A | 9/1999 | Yinger et al. | |
| 5,974,454 A | 10/1999 | Apfel et al. | |
| 6,006,034 A | 12/1999 | Heath et al. | |
| 6,006,035 A | 12/1999 | Nabahi | |
| 6,035,311 A | 3/2000 | McCool et al. | |
| 6,141,683 A | 10/2000 | Kraml et al. | |

(Continued)

OTHER PUBLICATIONS

Teri Schiele, "Windows 95 Application Setup Guidelines for Independent Software Vendors," Microsoft Corporation, May 1995, 13 pages. Retrieved from the Internet:<URL: wysiwyg://25/http://msdn.microsoft.com/library/techart/setup.html>.

(Continued)

*Primary Examiner*—Wei Zhen
*Assistant Examiner*—Mary Steelman
(74) *Attorney, Agent, or Firm*—Christensen O'Connor Johnson Kindness PLLC

(57) ABSTRACT

A software installation and semantic database validation system using custom actions is disclosed. The system includes a database engine module for maintaining a database. The database contains a custom action table, with columns in the table providing information about the action. Each row in the table represent an individual action. The system also includes an installation engine module operative to read an action value from an action column of the action row and causing an action specified by the action value to be performed by a computer. The actions can be executable programs, Dynamic Link Library modules, or script written in scripting languages such as JavaScript or Visual Basic.

17 Claims, 4 Drawing Sheets

U.S. PATENT DOCUMENTS

| | | | |
|---|---|---|---|
| 6,151,643 | A | 11/2000 | Cheng et al. |
| 6,161,218 | A | 12/2000 | Taylor |
| 6,202,070 | B1* | 3/2001 | Nguyen et al. ........... 707/104.1 |
| 6,237,144 | B1* | 5/2001 | Delo ........................ 717/174 |
| 6,363,499 | B1* | 3/2002 | Delo et al. .................... 714/15 |
| 6,370,686 | B1 | 4/2002 | Delo et al. |
| 6,378,127 | B1* | 4/2002 | Delo ........................ 717/174 |
| 6,378,128 | B1 | 4/2002 | Edelstein et al. |
| 6,389,414 | B1* | 5/2002 | Delo et al. ..................... 707/4 |
| 6,434,744 | B1 | 8/2002 | Chamberlain et al. |
| 6,490,722 | B1 | 12/2002 | Barton et al. |
| 6,550,061 | B1 | 4/2003 | Bearden et al. |
| 6,550,062 | B1 | 4/2003 | Barajas et al. |
| 6,598,223 | B1 | 7/2003 | Vrhel, Jr. et al. |
| 6,604,237 | B1 | 8/2003 | Giammaria |
| 6,606,744 | B1 | 8/2003 | Mikurak |
| 6,681,323 | B1 | 1/2004 | Fontanesi et al. |
| 6,681,391 | B1 | 1/2004 | Marino et al. |
| 6,735,768 | B1 | 5/2004 | Tanaka |
| 6,804,663 | B1 | 10/2004 | Delo |
| 6,920,631 | B1* | 7/2005 | Delo ........................ 717/174 |
| 2002/0087963 | A1 | 7/2002 | Eylon et al. |
| 2002/0092013 | A1 | 7/2002 | Delo |
| 2002/0092014 | A1 | 7/2002 | Shibusawa et al. |
| 2002/0095671 | A1 | 7/2002 | Delo et al. |
| 2002/0133814 | A1 | 9/2002 | Bourke-Dunphy et al. |
| 2002/0188939 | A1 | 12/2002 | Hediger et al. |
| 2003/0051235 | A1 | 3/2003 | Simpson |
| 2003/0188305 | A1 | 10/2003 | Morimoto |
| 2004/0015943 | A1 | 1/2004 | Chen |
| 2004/0015956 | A1 | 1/2004 | Barfield et al. |
| 2004/0117783 | A1 | 6/2004 | Kaminsky et al. |
| 2004/0128668 | A1 | 7/2004 | Iuchi |
| 2004/0139430 | A1 | 7/2004 | Eatough et al. |
| 2004/0177355 | A1 | 9/2004 | Wragge |
| 2004/0194078 | A1 | 9/2004 | Shen |
| 2004/0210893 | A1 | 10/2004 | Chamberlain et al. |

OTHER PUBLICATIONS

"Automating Microsoft Transaction Server Client Installation," Jun. 1997, Microsoft Corporation, <http://Main.Prodinfo.6/http:msdn.mi...m/library/backgrnd/html/msdn.sub.13install.html> [retrieved Oct. 22, 2004].

Burns, R., et al., "Version Management and Recoverability for Large Object Data," *The Fourth International Workshop on Multi-Media Database management Systems (MMDBMS)*, Aug. 1998, 8 pages.

Kelly, M. "Gain Control of Application Setup and Maintenance With the New Windows Installer," *Microsoft Systems Journal*, Sep. 1998, <http://www.microsoft.com/msj/0998/windowsInstaller.htm> [retrieved Jan. 1, 2003].

Zhang, Y., et al., "Version Support and Management in CIMS/EDBMS," *IEEE International Conference on Intelligent Processing Systems*, Oct. 28-31, Beijing, China, 1997, pp. 843-847.

* cited by examiner

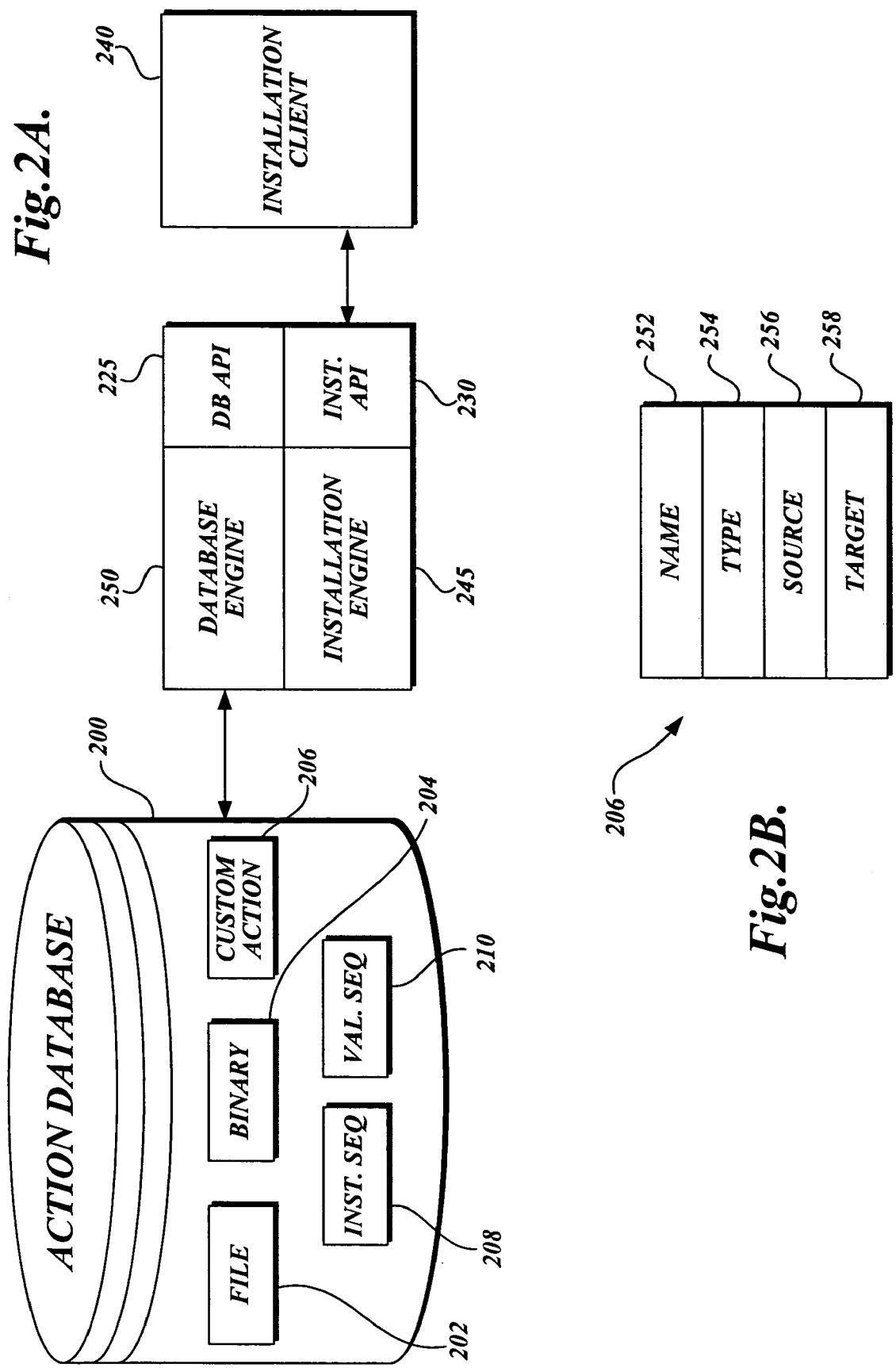

SOFTWARE INSTALLATION AND VALIDATION USING CUSTOM ACTIONS

CROSS-REFERENCE TO RELATED APPLICATIONS

This application is a continuation of U.S. patent application Ser. No. 09/994,254, filed Nov. 26, 2001, now U.S. Pat. No. 6,920,631, issued Jul. 19, 2005, and entitled SOFTWARE INSTALLATION AND VALIDATION USING CUSTOM ACTIONS; which is a continuation of U.S. patent application Ser. No. 09/157,776, filed Sep. 21, 1998, now U.S. Pat. No. 6,378,127, issued Apr. 23, 2002, and also entitled SOFTWARE INSTALLATION AND VALIDATION USING CUSTOM ACTIONS. The subject matter of application Ser. Nos. 09/994,254 and 09/157,776 is specifically incorporated herein by reference. This application is also related to the following applications, which were filed on Sep. 21, 1998, and assigned to the same assignee as the parent application: USE OF RELATIONAL DATABASES FOR SOFTWARE INSTALLATION, U.S. patent application Ser. No. 09/158,125, now U.S. Pat. No. 6,237,144, issued May 22, 2001; and METHOD AND SYSTEM FOR RESTORING A COMPUTER TO ITS ORIGINAL STATE AFTER AN UNSUCCESSFUL INSTALLATION ATTEMPT, U.S. patent application Ser. No. 09/158,124, now U.S. Pat. No. 6,363,499, issued Mar. 26, 2001.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1998, Microsoft Corporation, All Rights Reserved.

FIELD

This invention relates generally to database systems, and more particularly to providing custom actions within a database to perform software installation and semantic validation.

BACKGROUND

Software installation programs are intended to make it easy for computer users to install and upgrade software applications. Typically these installation programs copy files from an installation disk to desired directories on the user's computer. In addition, installation programs may update the computer's registry with desired information. More sophisticated installation programs also insure that any prerequisites to running the applications being installed have been met.

Until recently, installation programs have been procedurally based. That is, the installation program executes a series of steps in one or more procedures designed to copy files, update registry information, and configure the installed application. Each application to be installed typically required an installation script to be developed specifying the steps to be performed.

While procedural based installation programs made installing software applications easier, several problems remained. First, bugs in the installation software resulted in defective installations, resulting in user frustration, and worse, possible system software damage.

In addition, maintenance costs for procedural installation programs can be high. For example, many procedural installation programs are executed as a series of scripts outlining the steps to take. Finding and fixing bugs requires locating which script of a number of scripts is causing the problem. Also, the problem may be spread across a number of related scripts. Furthermore, the same problem may exist in multiple scripts, requiring each and every script to be located and fixed.

A related problem is that relationships between the scripts and procedures in a procedural based installation program may be hard to determine. Making a change to one procedure or script may result in a bug appearing in a different script.

Standardized installation programs were developed to address some of the above problems. Standardized installation programs were intended to solve some of the development and maintenance problems with previous installation programs by providing a set of common user interface modules and standardized methods for copying files and updating registry entries. Typically, the data for the installation is provided in a file, an example of which is the ".inf" file supported by Microsoft. These files contain various installation parameters and data items.

However, because each software package and each system is different, not all installation actions can be standardized. As a result, standardized installation programs typically must provide what is known in the art as "hooks" or entry points into the standard installation program for a developer to invoke a custom installation program. While these hooks provide for customization of an installation, the custom installation programs are typically self contained and do not communicate with the standard installation program, and therefore cannot affect the course of the remaining steps of the installation.

In addition, it is difficult to validate the data in the installation data file. The flies typically contain a series of keyword and value pairs, with sections of related data delimited by heading indicators. The sections and the text within a section can typically be in an arbitrary order. Generally, in order to validate the data using the above-described format, a custom data file validation program must be developed.

The next step in the evolution of installation programs has been the replacement of procedural installation programs with a database oriented installation program. Software installation can then be data driven, rather than procedure driven. Tables in the database specify files to be copied, registry entries to be entered, and other related installation data. Standard, built-in procedures then operate on this data. This has the advantage that installation maintenance and bug fixes are concentrated in one place, the database. In addition, standard low-level database validation techniques such as referential integrity can be performed on the data in the database.

While the above advantages are significant, several problems remain. First, some level of procedural customization is still required, even in a data driven system. Some database systems support the concept of a stored procedure, which allows a developer to invoke database procedures stored in the database. However, these procedures are generally limited to executing SQL database statements, and cannot interact with other components of the operating system providing file or registry services, nor can they communicate with the installation program to affect the remaining course of the installation.

In addition, while a database engine can typically provide a low-level syntactical validation of data elements and can ensure referential integrity, a database engine cannot provide for semantic validation of the data in the database, i.e. it cannot ensure that the data in the database is valid for a particular application and that the data is internally consistent. For example, a conventional database engine cannot determine that if data defining a dialogue box is present, that all of the buttons in the box have an action associated with them.

A second problem is that a database engine cannot properly validate circular references in the data. An example of a circular reference in the software installation context occurs when a table providing details on a component refers to a table comprising files in the installation package, and the table comprising files refer to the components in which the file is used. Because each table refers to the other, a circular reference is created. Standard database validation techniques cannot be used on such a reference, a custom validation action is required.

An example of a circular reference in the semantic validation context occurs in the data structures defining a dialogue box. A typical dialogue box allows a user to use a tab character to cycle through all the options available in the box. The database reflects this by providing a link from one data structure to the next, with the last linking to the first. Thus a circular reference is created. Again, standard database validation techniques cannot validate the structure, a custom action is required.

Thus what is needed is a system that provides to ability for a developer to provide custom actions within a software installation system. The system must provide for two-way communication between the custom action and a client application. The system should allow for multiple types of custom actions, and it should be easy to combine multiple actions into sequences of actions. In addition, the system should provide for invoking validation procedures that can validate the semantics of the data in the database as they relate to a particular software application installation. The validation procedures and data should be capable of being installed separately from any product related or installation-related data.

SUMMARY

The above-identified problems, shortcomings and disadvantages with the prior art, as well as other problems, shortcoming and disadvantages, are solved by the present invention, which will be understood by reading and studying the specification and the drawings. A system of the invention includes a database engine module for maintaining a database. The database contains a custom action table, with columns in the table providing information about the action. Each row in the table represents an individual action. The system also includes an installation engine module operative to read an action value from an action column of the action row and causing an action specified by the action value to be performed by a computer. The actions can be executable programs, dynamically loadable code such as Dynamic Link Library modules, or scripts written in scripting languages such as JavaScript or Visual Basic.

The custom actions can be invoked individually or as part of a sequence of other actions. In addition, the actions can be grouped as part of a transaction and executed when the transaction is committed.

Another aspect of the invention is that data defining the custom actions and sequences of actions to be performed can be maintained in multiple databases. This allows one database to store custom actions used for installing a software product, and another database to be used to store custom actions for semantically validating a database. The validation database can be merged with the installation database when validation is required.

Thus embodiments of the invention provide advantages not found in prior systems. The system allows a data-driven software installation program to be customized by defining custom actions that are invoked as necessary. Developers can make use of the services of a standardized data-driven installation engine, while having the flexibility to customize the installation when required. Moreover, the developer can build upon already existing actions using standard database techniques to edit a sequence table to include both the newly defined and pre-existing actions.

A further advantage is that databases shipped as part of a software package are smaller and more efficient. This is because the package need only provide the custom actions new or unique to the package. The new custom actions can then be "plugged in" to a database containing other custom actions. The entire set of custom actions is then available for use, either on a temporary or permanent basis. If the new custom actions are only required temporarily, they can be removed when no longer needed.

The system allows for a variety of different action types, providing a developer flexibility in using a variety of system resources beyond what is provided by a standard database engine. For example, the developer can call executable programs and scripts that can examine and set various system parameters. Furthermore, the actions can be written in an easy to use scripting language. The scripting language provides a more powerful and robust environment to define actions than the standard SQL and stored procedures typically available in a database engine.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

BRIEF DESCRIPTION OF THE DRAWINGS

FIGS. 2(a), 2(b) and 2(c) show-block diagrams of a system and data structures according to one embodiment of the invention.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced.

These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, a method, in accordance with an embodiment of the invention, is provided. Finally, in the fourth section, a conclusion of the detailed description is provided.

Hardware and Operating Environment

Figure 1:
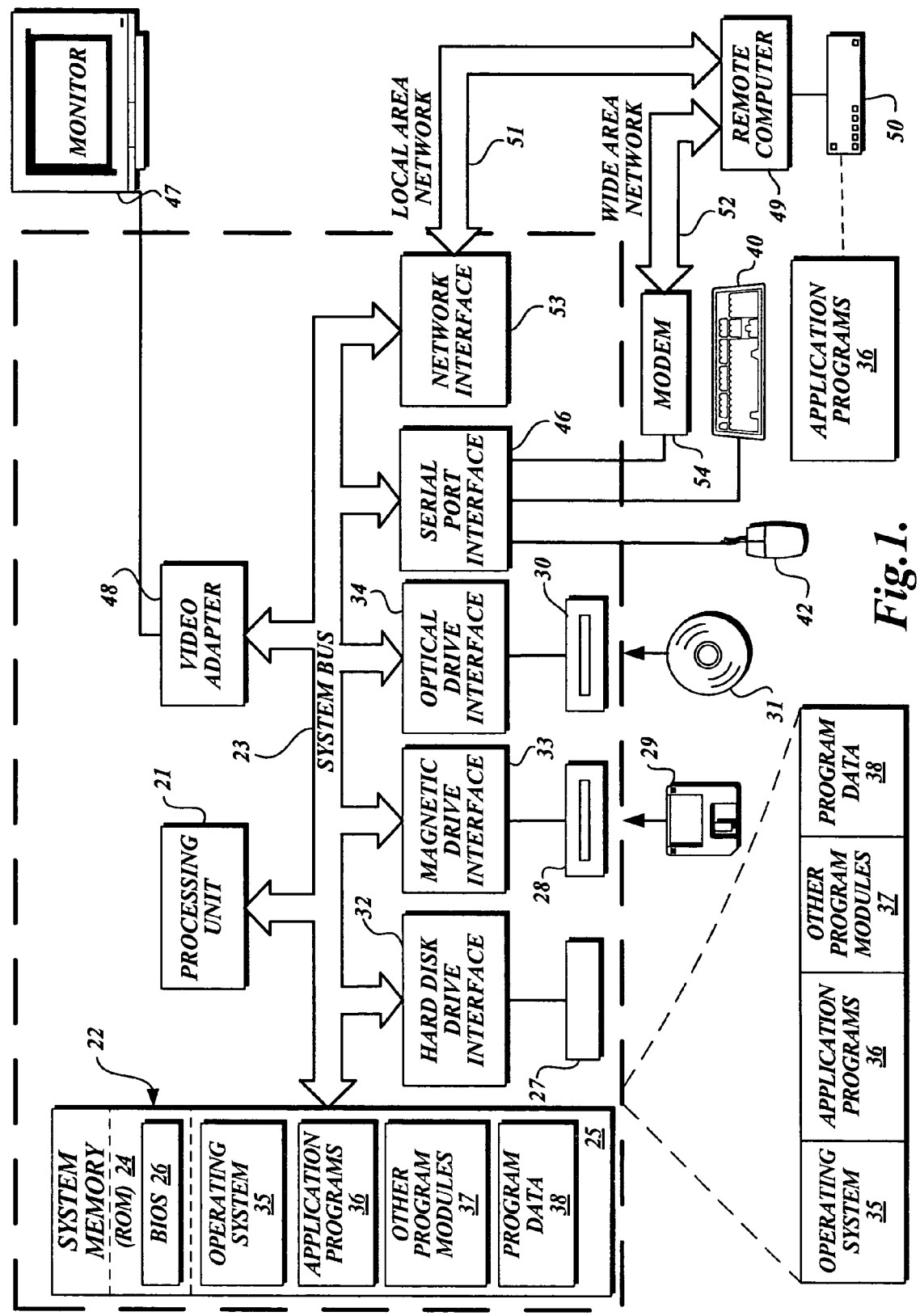
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing-devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2C:
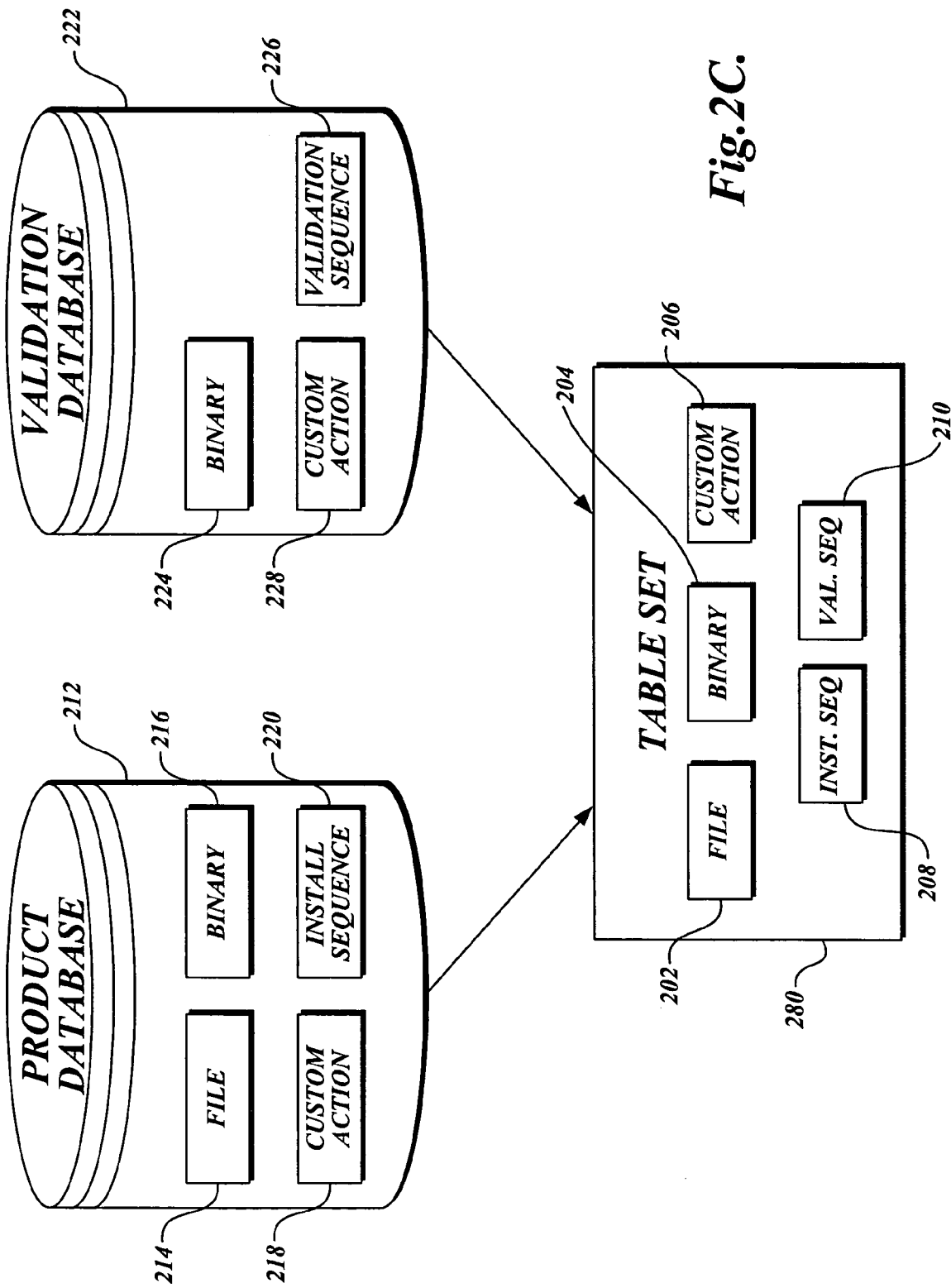

In this section of the detailed description, a description of a computerized system according to an embodiment of the invention is provided. The description is provided by reference to FIG. 2(a), a block diagram of a system of an embodiment of the invention, FIG. 2(b), a table used by the system, and FIG. 2(c), a merged table set of a non-persistent database created by the system of one embodiment of the invention.

In FIG. 2(a), a system according to an embodiment of the invention includes installation engine 245, database 200 and installation client 240.

Action database 200 is a conventional relational database and contains a plurality of data tables (not shown). In addition, database 200 contains a file table 202, a binary table 204, a custom action table 206, an installation sequence table 208, and a validation sequence table 210. Each of the tables has one or more columns having a defined data type such as integer, real, string, or binary data.

In one embodiment of the invention, file table 202 contains information regarding various files associated with the installation of a software product.

Binary table 204 contains binary image data comprising an executable module such as a dynamic link library (DLL), an executable program image, or an executable script.

Installation sequence 208 is a table that controls the order of actions to be performed during a software product installation. The table contains a column specifying a sequence number, and a column containing a reference to a custom action from the custom action table. Installation related actions can then be executed in the order specified by the sequence number column. In one embodiment of the invention, the table also contains a column containing a conditional expression. The expression is evaluated, and if the results are true, the custom action is executed.

Validation sequence 210 is a table that controls the order of actions to be performed during an installation database validation. Validation sequence 210, like installation sequence 208, contains a column specifying a sequence number and a column containing a reference to a custom action. Validation related actions can be executed in the order specified by the sequence number column. Like installation sequence 208, validation sequence 210 also contains a column optionally containing a logical expression to control whether or not the action is executed.

Custom action table 206 contains data providing details on an action that can be performed, and will be further described with reference to FIG. 2(b).

Installation engine 245 is a software module defining a standardized interface for installing software and validating software installation databases. In one embodiment of the invention, installation engine 245 is linked with modules such as database engine 250, and other modules providing various services, including operating system services. In addition, installation engine 245 implements functions defined by installation Application Program Interface (API) 230. These functions include computer instructions to execute the method described below with reference to FIG. 3. In addition, the functions provide a mechanism for client applications to cause actions to be performed, and for results of the action to be communicated back to the client application. It is desirable that these functions are included as part of installation engine 245. However, the invention is not so limited, and the functions could be part of another component or library included in an application, or even a standalone component or application.

Installation API 230 is an application program interface used by a client application such as installation client 240. The API defines the interface between the client and the installation engine 245. Typically, installation API 230 defines a set of function calls providing a client application with standardized routines to control the installation of a software package. These standardized routines use the data in database 200 to perform the various installation and validation actions.

Database engine 250 is a computer program responsible for maintaining database 200. Database engine 250 is an interface between client applications and the database 200. Database engine 250 performs various operations such as reading data from the database in response to application program queries, writing data to the database when an application program inserts, deletes, or updates a row in the database. In addition, database engine 250 commonly maintains indexes associated with tables in the database.

Database API 225 defines an interface between database engine 250 and client applications desiring to use the database engine. The functions defined by database API 225 are typically implemented within database engine 250.

In one embodiment of the invention, the functions defined by database API 225 and installation API 230 are exposed to client applications as a single interface.

Installation client 240 is a client application requiring the services provided by installation engine 245. In one embodiment of the invention, installation client 240 is a software installation application designed to provide a robust and easy to use interface for installing software applications from an installation medium to a user's computer system. In an alternative embodiment of the invention, installation client 240 is a software installation database validation tool.

An example of how the above-described components are used will now be presented. After establishing a connection to installation engine 245 and calling any required initialization functions provided by installation API 230, installation client 240 calls the function "MsiSequence" defined by installation API 230 and implemented within installation engine 245, passing the name of an installation sequence table 208. Execution control is now in installation engine 245. MsiSequence uses database engine 250 to read rows from the sequence table in the order specified by the sequence number. As each row is read, the installation engine determines if a logical expression is contained in an expression column of the sequence table. If so, the installation engine 245 evaluates the expression. If the expression evaluates to false, the action is skipped. If no expression has been defined, or if the expression evaluates to true, the action named in the action column of the sequence table is executed. The action may be a built-in action or a custom action.

A built-in action is a generic installation action such as copying a file to a desired location, setting a registry entry or updating system configuration information. These actions are handled directly by installation engine 245.

Custom actions are those actions requiring more particular processing, such as database validation. The developer must develop software to implement the custom action. The software can be written in a standard programming language, compiled and linked into an executable program or dynamically loadable library of modules. Alternatively, the software can be written in a scripting language such as JavaScript or Visual Basic. In either case, the resultant software can be loaded into binary image table 204, or it can be kept in a file, in which case the file name will be placed in file table 202.

If the action specified by the current row of the installation sequence table is a custom action, installation engine uses the action name specified as a key into the custom action table 206, which contains information regarding the action, such as where the software implementing the action is located, where to start the action, and any parameters to be passed to the action. The installation engine reads the identified row from the custom action table and determines the specific type of custom action. If the custom action is implemented as a dynamically loadable library module or other executable, the installation engine loads the custom action into memory. If the custom action software is a script, the installation engine passes the script to an appropriate interpreter.

After all rows of the installation sequence table have been read and processed, the status of the sequence of actions is passed back to the installation application, which can take whatever action is appropriate based on the success or failure of the sequence of actions.

In an alternative embodiment of the invention, the execution of a sequence of actions defined in a sequence table is replaced with the execution of a single action. In this case, application 240 calls the function "MsiDoAction" provided installation engine 245, passing the name of the action as a parameter to the call. Installation engine 245 then uses the name as a key into custom action table 206 of database 200, reads the desired row, and executes the action in the same manner as an action invoked from a single row of the sequence table described above.

In FIG. 2(*b*), a detailed description of custom action table 206 is provided. Custom action table 206 comprises a set of columns specifying an action that can be performed upon an appropriate call to the functions implementing the methods of the invention. In one embodiment of the invention, custom action table 206 includes the following columns: name 252, type 254, source 256 and target 258. The uses and interactions of these tables will be detailed below.

Name 252 is an identifier used to uniquely identify a particular action. In one embodiment of the invention, name can be passed as a parameter to a function implemented within installation engine 245 to cause the action to be invoked.

Type 254 specifies the particular type of custom action, and typically indicates whether the instructions of the custom action are an executable or a script. Desirably, type is a bit field, with particular bits set to indicate a particular type. In one embodiment of the invention, executables comprise modules from a conventional Dynamic Link Library (DLL) and a conventional EXE file containing a computer program to perform the custom action. Also in an embodiment of the invention, scripts can written in the JavaScript language and the Visual Basic language. Those of ordinary skill in the art will recognize that other executable formats and script languages could be substituted for those specified above. For example, the PERL script language could also be used by systems of the invention.

The interpretation of source 256 and target 258 vary depending on the type of the custom action specified by type 254. In general, source 256 is used to specify where the computer instructions comprising the action reside. Potential source locations include data columns from other tables in the database, files in the file system, directories, or from the target 258 column of the custom action table. Target 258 provides further information about the action, typically providing information about the entry point or function call used to start the action. Details on the interpretation of these columns will now be presented.

In an embodiment of the invention, a DLL type is indicated using one of two values. The first value indicates that the DLL is in a binary table. The source 256 column contains a key referencing a row of the binary table which contains the DLL as a stream. The second value indicates that the DLL is in a file that is installed with the product. The source 256 column contains a key into the file table specifying the file comprising the DLL. In both cases, the target 258 column contains what is known in the art as the DLL entry point.

In a further embodiment of the invention, an EXE type executable is indicated by one of four values. The first value indicates that the EXE is in a binary table. The source 256 column contains a key referencing a row of the binary table which contains the EXE as a data stream. The second value indicates that the EXE is in a file installed with the software product. The source 256 column contains a key into a file table specifying the file containing the executable image. The third value indicates that a property contains the file name comprising the executable image. The source 256 column contains a key into a property table identifying the property containing the file name. In the above three cases, the target 258 column contains a conventional command-line string that is passed to the executable. The fourth value indicates that the EXE is in a separate working directory. In this case, the source 256 column contains a key into a directory table, and the target 258 column contains a conventional path to the EXE and the command-line to be supplied to the EXE.

It is desirable for the type field to also provide for indicating a particular mode for executing the DLL or EXE code. In one embodiment of the invention, bit values are used to indicate that the return code from the DLL or EXE should be ignored. These bit values indicate that the action should be considered a non-critical action. Additional bit values are used to indicate that the DLL or EXE should run asynchronously with the rest of the installation actions. Still further bit values are used to indicate whether the installation engine waits for the action to finish at the end of a sequence of actions, or at the end of the installation or validation program. Those skilled in the art will recognize that alternative methods of specifying a mode for an executable exist, for example, an additional column could be used to hold data indicating a mode.

In addition to bits indicating actions comprising executables, type 254 comprises bits to indicate that a script file should be processed when an action is invoked. In one embodiment of the invention, bit values indicate that a script in the JavaScript language is to be processed. In a further embodiment of the invention, bit values indicate that a script in the Visual Basic scripting language is to be invoked. The bit values in type 254, in combination, also indicate four modes for locating and invoking the script. In the first mode, the script is stored in binary table 204 as a stream of data. Source 256 is a key into binary table 204. In the second mode, the script is in a file installed as part of the software product. In this mode, source 256 is a key into file table 202. In the third mode, the script is stored as text contained in a property value. Source 256 is a key into a property table in this mode. For the above three modes, target 258 contains an optional identifier specifying a function within the script to call. In the fourth mode, source 256 is null and the script is stored in target 258.

In a still further embodiment, type 254 indicates that a "nested install" is to occur. A nested install is an installation in which an installation program causes another installation program to be invoked. This mechanism is typically used when a software package uses other software components that must be installed if they are not currently present on the system. There are four values associated with a nested install. The first value indicates that the installation components are contained in the current package. Source 256 indicates the substorage name of the component. The second value indicates that the component is located in a source directory tree. In this case, source 256 indicates a relative directory path to the installation component. The third value indicates that the installation component is located in a named location. In this case, source 256 indicates a property name or a key into a property table containing the location of the installation component. The fourth value indicates that the installation component is identified by a product code. In this case, source 256 contains the product code. In all of the above cases, target 258 contains a property settings string comprising property/value pairs to configure the nested install.

It is desirable to provide for options to be associated with custom actions. In one embodiment of the invention, type 254 has bit values describing various options for processing the custom action. For example, one value indicates that the action should be skipped if it is invoked as part of a sequence of user interface actions. A second value indicates that special processing should take place if the custom action is invoked from within an installation server. Additional bit values indicate that the custom action is part of what is known in the art as a transaction, and should be executed either upon a commit or a rollback. Still further bit values provide different security options for processing the custom action. In one embodiment of the invention, these bit values specify whether an action should impersonate a user when the action is invoked in a network environment.

A further aspect of the invention as it relates to installation database validation is shown in FIG. 2(*c*). It is desirable, when validating an installation database, to be able to temporarily merge a database containing validation actions with a database containing installation actions. In one embodiment of the invention, product database 212 contains installation related data. Among the tables in product database 212 are a file table 214, a binary table 216 an installation custom action table 218, and an installation sequence table 220. Validation database 222 contains a binary table 224, a validation custom action table 228, and a validation sequence table 226. Typically, validation database 222 exists as part of a tool provided in a software developers kit.

In one embodiment of the invention, validation database 222 is merged with product database 212 to create table set 280. In this embodiment, both databases are opened in read-only mode and table set 280 represents the merged databases before the merged database is persisted as action database 200. (i.e. before the table set is written to a file comprising action database 200). Binary tables 215 and 224 are merged together to form binary table 204 of table set 280. Likewise, custom action tables 218 and 228 are merged to create custom action table 206.

Sequence tables 220 and 226 are not merged, because they have unique table names and are copied separately into table set 280. This allows for the separate invocation of validation actions.

Desirably, table set 280 is non-persistent and separate from product database 212. This is desirable because at the end of the installation or validation, the merged table set no longer is needed and should be removed in order to reduce system resource requirements. Creating action table set 280 as a separate table set is also desirable because it allows product database and validation database to be opened in a read-only mode. This facilitates installation and validation in network environments, and reduces the risk of corruption of the product database 212. While creating table set 280 is desirable, it is possible to import validation database directly into product database 212 to create action database 200.

Method

In this section of the detailed description, a method according to an embodiment of the invention is presented. This description is provided in reference to FIG. 3. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. Thus, in one embodiment, a computer program is executed by a processor of a computer from a medium therefrom to provide customized installation and validation actions stored in a database.

Figure 3:
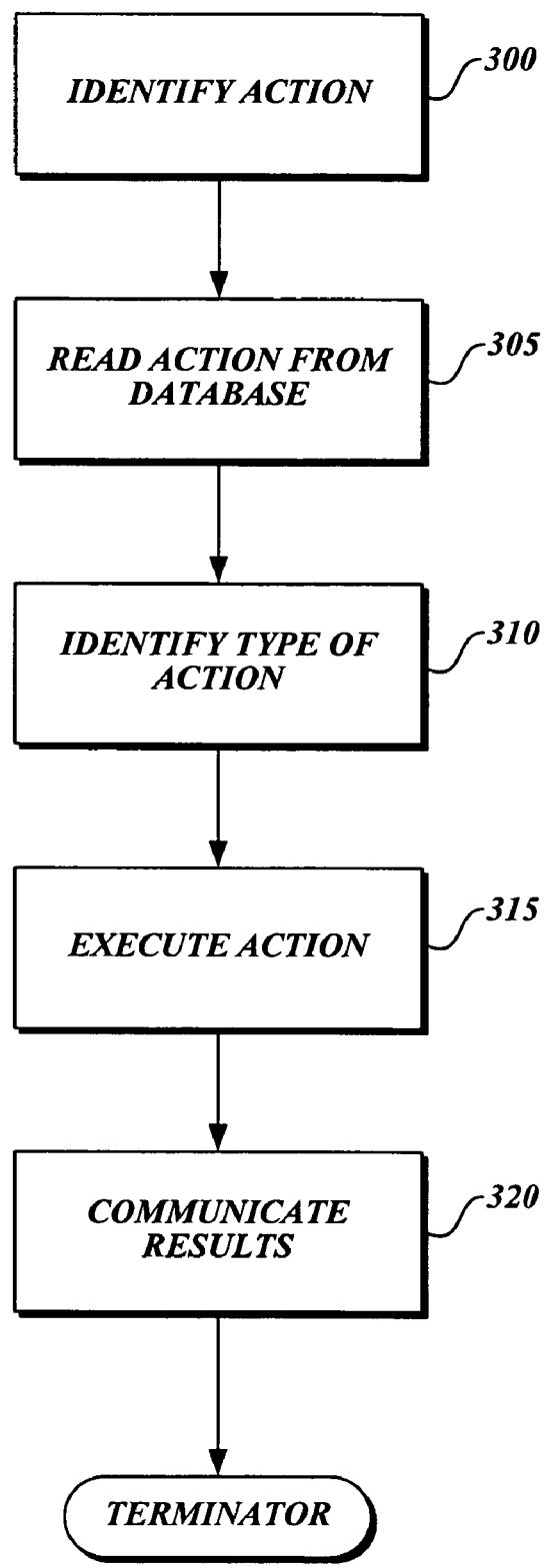
FIG. 3 shows a flowchart illustrating a method according to one embodiment of the invention.

In FIG. 3, a flowchart of a method according to one embodiment of the invention is shown. In one embodiment of the invention, the method can be invoked using one of two methods defined in the Application Program Interface (API) 230 for installation engine 245. The first method is called MsiDoAction. This method takes an action identifier, which may be a custom action, as a parameter, and invokes the method detailed below. The second method is called MsiSequence. It takes a sequence table as a parameter and invokes the method below for each custom action in the sequence table. Actions, both custom and built-in, are invoked in the order specified by a sequence number in the sequence table.

The method begins at 300, where the custom action to be invoked is identified. Custom actions are identified by a name, which, as indicated above, is either passed in as a function parameter or read from a sequence table. The name of the custom action is a key into the custom action table.

Next, at 305, action details are read from the action table of the database. Included in the details are the action type, the source location for the action and the entry point, command line, or function call used to start the action.

The method then proceeds to 310, where the type of action is identified and the appropriate action load method is executed. For example, if the action type is DLL, the method calls operating system specific functions to dynamically load and link the library specified in the source column described above in reference to FIG. 2(*c*). For security reasons, it is desirable to provide the ability to run the DLL in a separate process if the installation engine is running in an operating system service. This is desirable, because an operating system service may have more privileges than the custom action should have. The impersonation bit described above controls whether action executes in the context of the installation service with the same security privileges as an operating system service, or if a separate process is created with user level privileges. Running a DLL within the context of an operating system service is typically only done when the custom action needs to examine, or copy files in directories the user would not ordinarily have privileges to write in. Otherwise, it is desirable for the action to be executed outside of the context of the operating system service using the privileges ordinarily granted to the user invoking the installation or validation. Running as a user level process is also desirable if the action needs to use network resources, because the process will be able to "impersonate" the user when accessing network resources.

If the action type is EXE, the method calls operating system specific functions to start a new executable process specified by the source column and passes it a command line specified by the target column 258. Again, for the security reasons described above, it may be desirable create the process as a user process having user privileges if the installation engine is running in an operating system service. Otherwise, the process can be created as a child process of the installation engine, and inherit the same privileges as the installation engine. Whether a user process or child process is created is controlled by the impersonation bit described above.

If the action type specifies a script file, the method passes a script specified by the source column to the appropriate script interpreter. In one embodiment of the invention, a JavaScript interpreter is used. In an alternative embodiment of the invention, a Visual Basic script interpreter is used. Security privileges for the script are determined by the interpreter.

Next, at 315, the method causes the action to be executed. Execution of the action starts at the entry point defined in the target column of the custom action table. For DLLs, the entry point is determined by a function name. For EXEs, the target column defines a command line string that is passed in lieu of an entry point (as is customary for selecting execution options for an EXE). For script files, the entry point is a function within the script.

The method ends at step 320, where the results of the custom action are communicated back to the application. In the case of an installation application, the results typically indicate whether or not the files, registry entries or other installation entities affected by the action were properly installed. The results communicated back to the installation application can then be used to determine further courses of action. In the case of a validation application, the results typically indicate whether or not the database entities examined by the custom action are valid.

In one embodiment of the invention, the results codes for DLL and script type custom actions include: action not executed, action completed successfully, user terminated prematurely, unrecoverable error occurred, sequence suspended to be resumed later, and skip remaining actions (not an error). Also in an embodiment of the invention, the results code for EXE type custom actions return zero for success, and non-zero value for failure. The result codes for DLLs, scripts and EXE type custom actions can also be affected in accordance with the bit value described above that defines an action as non-critical. In this case, the error codes listed above will be ignored.

CONCLUSION

A software installation and semantic database validation system has been described. Although specific embodiments have been illustrated and described herein, it will be appreciated by those of ordinary skill in the art that any arrangement which is calculated to achieve the same purpose may be substituted for the specific embodiments shown. For example, the specification has presented details of the invention in the context of software applications comprising software installation tools and installation database validation tools. Other types of software applications can be developed or adapted to receive the benefits provided by the methods and systems described herein. In addition, the modes and options in the custom actions table can be distributed across one more columns. This application is intended to cover any adaptations or variations of the present invention. Therefore, it is manifestly intended that this invention be limited only by the following claims and equivalents thereof.

I claim:

1. A method for a validation program to validate an installation of software comprising:
    identifying an individual action stored within a database, the database having a first custom action table, said first custom action table having a plurality of action columns for specifying data corresponding to aspects of an installation action that may be taken as part of a standardized data-driven installation and at least one action row for representing an individual installation action taken as part of a standardized data-driven software installation;
    reading the individual action from the database;
    identifying a type for the individual action;
    validating the individual action in a manner based upon the type for the individual action; and
    communicating the results of the validation of the individual action to the installation program.

2. The method of claim 1, wherein the type of the individual action specifies a dynamically loadable library and wherein validating the individual action includes validating a module is able to be loaded from the dynamically loadable library.

3. The method of claim 1, wherein the type of the individual action specifies a program and wherein validating the individual action includes loading the program and determining that the program is executable.

4. The method of claim 1, wherein the type of the action specifies a script and validating the action submits the script to an interpreter and determines that the script is interpretable.

5. The method of claim 4, wherein the script comprises instructions in the JavaScript language or the Visual Basic language.

6. The method of claim 1, wherein validating the action causes the action to be stored in a table of actions to be deferred until a commit action is executed.

7. A computer comprising:
    a processor;
    a computer-readable medium;
    a database engine module for maintaining a first database, said first database having a first custom action table, said first custom action table having a plurality of action columns for specifying data corresponding to aspects of an installation action that may be taken as part of a standardized data-driven installation and at least one action row for representing an individual installation action taken as part of a standardized data-driven software installation; and an installation engine module operative to read an action value from at least one action column of the action row and to cause an action specified by the action value for validating a portion of a software installation to be performed by a computer as part of a standardized data-driven software installation.

8. The computer of claim 7, wherein the action value specifies an executable program.

9. The computer of claim 8, wherein the script is in a JavaScript syntax or a Visual Basic syntax.

10. The computer of claim 7, wherein the action value specifies a dynamically loadable module.

11. The computer of claim 7, wherein the action value specifies a script.

12. A computer-readable medium having computer-executable instructions for performing the steps comprising;

identifying an individual action stored within a database, the database having a first custom action table, said first custom action table having a plurality of action columns for specifying data corresponding to aspects of an installation action that may be taken as part of a standardized data-driven installation and at least one action row for representing an individual installation action taken as part of a standardized data-driven software installation;

reading the individual action from the database;

identifying a type for the individual action;

validating the individual action in a manner based upon the type for the individual action; and communicating the results of validating the individual action to the installation program.

13. The medium of claim 12, wherein the type of the individual action specifies a dynamically loadable library and wherein validating the individual action includes validating that a module is able to be loaded from the dynamically loadable library.

14. The medium of claim 12, wherein the type of the action specifies a program and validating the action loads the program and determines that the program is executable.

15. The medium of claim 12, wherein the type of the action specifies a script and validating the action submits the script to an interpreter and determines that the script is interpretable.

16. The medium of claim 15, wherein the script comprises instructions in the JavaScript language or the Visual Basic language.

17. The medium of claim 12, wherein executing the action causes the action to be stored in a table of actions to be deferred until a commit action is executed.

* * * * *

UNITED STATES PATENT AND TRADEMARK OFFICE
CERTIFICATE OF CORRECTION

PATENT NO. : 7,047,529 B2  Page 1 of 1
APPLICATION NO. : 10/995031
DATED : May 16, 2006
INVENTOR(S) : Delo It is certified that error appears in the above-identified patent and that said Letters Patent is hereby corrected as shown below:

On the Title Pg. On page 2, Item (56), under "U.S. Patent Documents", line 13, after "6,550,062" delete "B1" and insert -- B2 --, therefor.

In column 4, line 55, delete "show-block" and insert -- show block --, therefor.

In column 15, line 22, in Claim 12, after "comprising" delete ";" and insert -- : --, therefor.

Signed and Sealed this

Thirteenth Day of April, 2010

David J. Kappos
*Director of the United States Patent and Trademark Office*